United States Patent [19]
Yamagiwa et al.

[11] Patent Number: 4,672,150
[45] Date of Patent: Jun. 9, 1987

[54] CONDUCTOR SUPPORTING APPARATUS FOR GAS INSULATED EQUIPMENT

[75] Inventors: Tokio Yamagiwa; Toshio Ishikawa; Fumihiro Endo, all of Hitachi, Japan

[73] Assignee: Hitachi, Ltd., Tokyo, Japan

[21] Appl. No.: 914,070

[22] Filed: Oct. 1, 1986

[30] Foreign Application Priority Data

Oct. 4, 1985 [JP] Japan .................................. 60-220097

[51] Int. Cl.⁴ ................................................ H02G 5/06
[52] U.S. Cl. ..................................... 174/14 R; 174/28; 174/99 B
[58] Field of Search ................. 174/14 R, 16 B, 22 C, 174/28, 99 B

[56] References Cited
FOREIGN PATENT DOCUMENTS 53-107168  8/1978  Japan .................................. 174/14 R

OTHER PUBLICATIONS

Crucius, M., et al., "Long Duration Tests on Epoxy Insulators in SF₆ Gas", CIGRE Report 15-07, 1978 Session, Aug. 30 to Sep. 7, 9 pages.

Primary Examiner—Laramie E. Askin
Attorney, Agent, or Firm—Antonelli, Terry and Wands

[57] ABSTRACT

The invention relates to a conductor supporting apparatus for gas insulated equipment in which a high voltage conductor which is arranged in a grounded tank is insulated and supported by an insulating spacer having attaching metal fittings at both end portios. In the apparatus of the invention, a cylindrical insulating barrier having a flange portion on the side of the free end so as to be substantially perpendicular to the surface of the insulating spacer is attached by use of the attaching metal fitting of the insulating spacer on at least the side of the grounded tank. The insulating spacer is surrounded by this insulating barrier through a space. By use of the insulating barrier, the approach of conductive foreign matters to the insulating spacer can be prevented and the high dielectric strength can be maintained.

8 Claims, 4 Drawing Figures

THICKNESS OF
BARRIER: 0.25mm

CONDUCTOR SUPPORTING APPARATUS FOR GAS INSULATED EQUIPMENT

BACKGROUND OF THE INVENTION

1. Field of the Invention

The present invention relates to a conductor supporting apparatus for gas insulated equipment and, more particularly, to a conductor supporting apparatus for gas insulated equipment provided with an insulating spacer having a high dielectric strength in which the deterioration of insulation performance is small even when conductive foreign matters such as metal are deposited.

2. Description of the Prior Art

For the insulating spacer which is used in the grounded tank of gas insulated equipment and supports the conductor, the shape of the insulating spacer which can cope with the cases where conductive foreign matters such as metal are deposited on the surface of such an insulating spacer and the like is disclosed in Cigre Report 15-07, 1978 Session, August 30 to September 7, "LONG DURATION TESTS ON EPOXY INSULATORS IN $SF_6$ GAS". A feature of such an insulating spacer is that a plurality of creepage flanges are formed on the creeping surface. Some consideration has been given with respect to which shapes of creepage flanges are effective under the situations where conductive foreign matters such as metal enter the gas insulated equipment and are deposited onto the surface of the insulating spacer. In addition, there also has been considered an approach whereby the creepage flanges are not directly formed on the insulating spacer itself but barrier-like insulating members are provided near the surface of the insulating spacer (for example, refer to Japanese Utility Model Laid-Open No. 107168/78). However, when considering the easiness of manufacturing and the costs and the like, it is desirable to reduce the number of barriers as much as possible and to reduce the changes from the conventional structure as much as possible. In particular, these considerations become more and more significant subjects in gas insulated equipment in which high voltage and miniaturization are intended to be attained.

A conventional use example of the insulating spacer in a gas insulated bus-bar, which is the gas insulated equipment selected for the purpose of illustration, will now be described in more detail. In a gas insulated bus-bar, a high voltage conductor for current supply is arranged in a cylindrical grounded tank, and the high voltage conductor is insulated and supported from the grounded tank by an insulating spacer. Insulating gases such as $SF_6$ and the like which have excellent insulation performance are filled in the grounded tank of a gas insulated bus-bar or other such gas insulated equipment. If conductive foreign matters such as metal pieces should enter the gas insulated equipment, these metal pieces are subjected to electrostatic forces by the electric field in the gas insulated equipment, so that they float. In other words, they float in the equipment although they depend on the sizes of conductive foreign matters or the electric field strengths. In the worst case, the conductive foreign matters are deposited onto the surface of the insulating spacer or approach the high voltage conductor, so that an unexpected accident may occur. Therefore, it is an important subject in the improvement of the reliability to obtain an insulating spacer in which the deterioration of the insulation performance is small even under such a situation. As described above, it is effective as a countermeasure for such a problem to form creepage flanges on the insulating spacer. However, since the electric fields are concentrated among the creepage flanges, this method is disadvantageous for the performance when the insulating spacer is cleaned, and at the same time there are the problems such that the conditions in manufacturing and assembling are fairly restricted, and the like.

SUMMARY OF THE INVENTION

It is an object of the present invention to provide a conductor supporting apparatus for gas insulated equipment comprising a highly economical insulating spacer having a high withstand voltage in which even if conductive foreign matters such as metal enter the gas insulated equipment and approach the insulating spacer, the deposition of the conductive foreign matters onto the surface of the insulating spacer is prevented and large deterioration of the insulation performance is not caused.

In the conductor supporting apparatus for gas insulated equipment according to the present invention, a high voltage conductor to be arranged in a grounded tank which is filled with insulating gas is insulated and supported by an insulating spacer having attaching metal fittings at both ends; in this case, an insulating barrier having a flange portion on the side of the free end so as to be substantially perpendicular to the surface of the insulating spacer is attached to the portion of the insulating spacer at least on the side of the grounded tank, thereby allowing the insulating spacer to be surrounded through a space; and the approach of the conductive foreign matters to the insulating spacer is prevented by this insulating barrier.

DESCRIPTION OF THE PREFERRED EMBODIMENTS

In insulating material such as glass or the like which is used in the atmosphere, it is known to increase the leakage distance by forming the creepage flanges on the creeping surface of the insulating material, so that the pollution-proof performance is improved. However, in the case of creepage flanges on insulators which are used in gas insulated equipment, it is impossible to expect protection from foreign matter simply by increasing the linkage distance. Rather, electric discharge obstruction by the creepage flanges is mainly obtained. In the case of the use of a barrier, the position of the barrier and the size of barrier are the significant factors.

Figure 2:
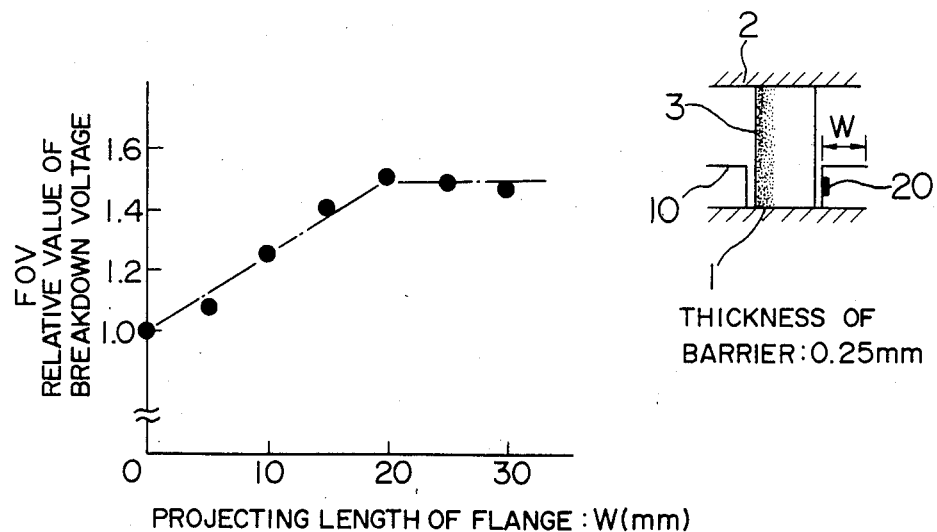
FIG. 2 is an insulating structure used in the present invention and a characteristic diagram showing the principle of the present invention.

In consideration of those points, the inventors of this invention have studied with respect to whether thin barriers in place of creepage flanges can cope with the foregoing problems or not. A part of FIG. 2 shows an insulating structure in which a flange-shaped barrier 10 is formed using an insulating member having a thickness of 0.25 mm and arranged on the side of a grounded tank 1 of an insulating spacer 3. The other part of FIG. 2 is a graph showing the result in which a metal wire was deposited between the insulating material flange and the grounded tank 1 and the breakdown voltages were measured. It has been found from this graph that the barrier effect is obtained when a projecting length W of the flange increases and that the breakdown voltage can be improved about 1.5 times when the width of barrier is at least 20 mm. This is because the electric discharge generated from the metal wire relatively easily progresses since it becomes the creeping surface discharge until the edge of the flange is encountered; however, the discharge is difficult to progress in the portion beyond the flange edge portion since it becomes the gas spatial discharge (which requires a high voltage than that of the creeping surface discharge).

It should be noted that a large effect is derived even in the case of using an extremely thin barrier of 0.25 mm. Therefore, in the case of the insulating member having a thickness of about 1 to 5 mm, which is ordinarily used, the influence which will be exerted on the electric fields of the creeping surface of the insulating spacer (the potential distribution largely changes in the case of creepage flanges of extremely large thicknesses) can be remarkably reduced. Advantageously, the barrier of the invention can be easily applied without changing the shape of the insulating spacer which is currently used.

Figure 1:
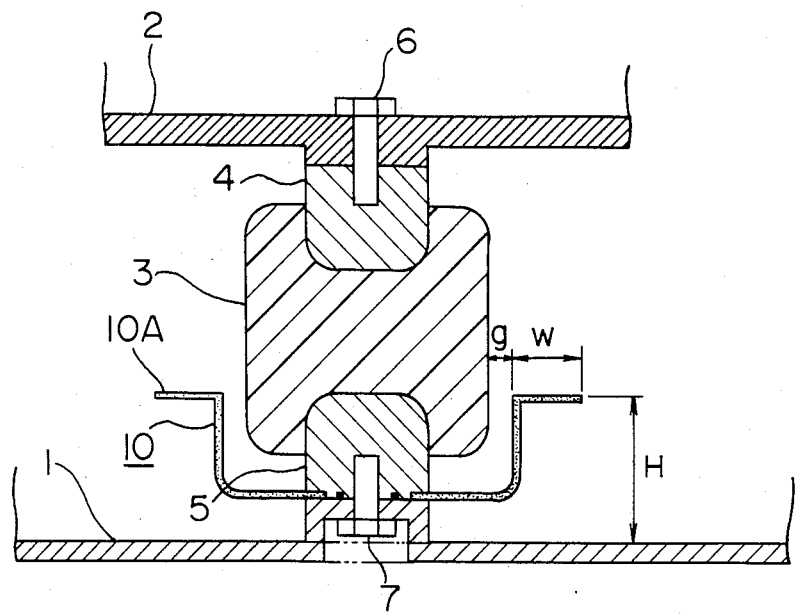
FIG. 1 is a vertical sectional view showing an embodiment of a conductor supporting apparatus for gas insulated equipment according to the present invention.

FIG. 1 shows a practical embodiment of the present invention and illustrates a gas insulated bus-bar in which a high voltage conductor 2 is arranged in a grounded tank 1 which is filled with insulating gas and an insulating spacer 3 is provided to insulate and support the conductor 2 in the grounded tank 1. Attaching metal fittings 4 and 5 are embedded in both ends of the insulating spacer 3 to attach it. In this example, the insulating spacer 3 is attached by clamping it by use of clamping bolts 6 and 7 to the conductor 2 and tank 1, respectively. The method of attaching the insulating spacer 3 is not limited to the method in the above structure, but various kinds of well-known methods can be used. For example, as shown by an alternate long and two short dashes line in FIG. 1, the grounded tank 1 may be also constituted such that the outer surface is not modified but is formed conventionally like a straight line and an attaching seat is welded onto the inner surface; the insulating spacer 3 then may be attached to the attaching seat.

In the foregoing structure, the insulating barrier 10 having a flange 10A formed by the insulating member of the thickness as previously mentioned is attached so as to be sandwiched by use of the grounded tank 1 and attaching metal fitting 5 on the side thereof, thereby allowing the insulating spacer 3 to be surrounded.

As the dimensions of the insulating barrier 10 which is used in this example, the height H from the ground tank 1 and the projecting length W of the flange portion 10 are fundamentally considered. First, the height H must be above the highest floating height h of conductive foreign matters 20 which will be assumed in the gas insulated equipment as shown in FIG. 2 (namely, H>h). With such dimensions, even if the conductive foreign matters should approach the portion of the insulating spacer 3, they will be deposited onto the cylindrical portion of the insulating barrier 10 as shown in FIG. 2, so that the sufficient barrier effect can be expected.

Next, it is desirable that the projecting length W is set to be above 10 mm in order to obtain the effect of a certain degree as shown in FIG. 2. The projecting length W also varies by the diameter of grounded tank 1. However, in general, when the length W is above 20 mm, there is the tendency that the effect is saturated (the slight deterioration of the effect is also considered). Therefore, it is desirable to set the length to be below tens of millimeters. On the other hand, since the sufficient effect can be derived even when the thickness of insulating barrier 10 is below 1 mm, it is sufficient to set the thickness to a value such as not to cause a change in shape. As the material of the insulating barrier 10, a material having a low dielectric constant is preferable so as not to disturb the electric fields because the insulating barrier is arranged near the insulating spacer 3. For example, a resin of polyester, polyethylene, or ethylene tetrafluoride system may be used. It is suitable to mold and use such a resin.

The space g between the insulating spacer 3 and the insulating barrier 10 needs to be set to a value of at least about a few millimeters. If the spacer 3 comes into contact with the barrier 10, at least a small gap will be caused in their contact portions, causing the insulation performance of the creeping surface to deteriorate because of the concentration of the electric fields.

By use of the above structure, even if the conductive foreign matters enter the grounded tank 1, the deterioration of the insulation performance can be suppressed and the insulation reliability can be improved. In addition, since it is sufficient merely to attach the insulating barrier 10 without changing the shape of the insulating spacer 3, this structure is also economically advantageous.

Figure 3:
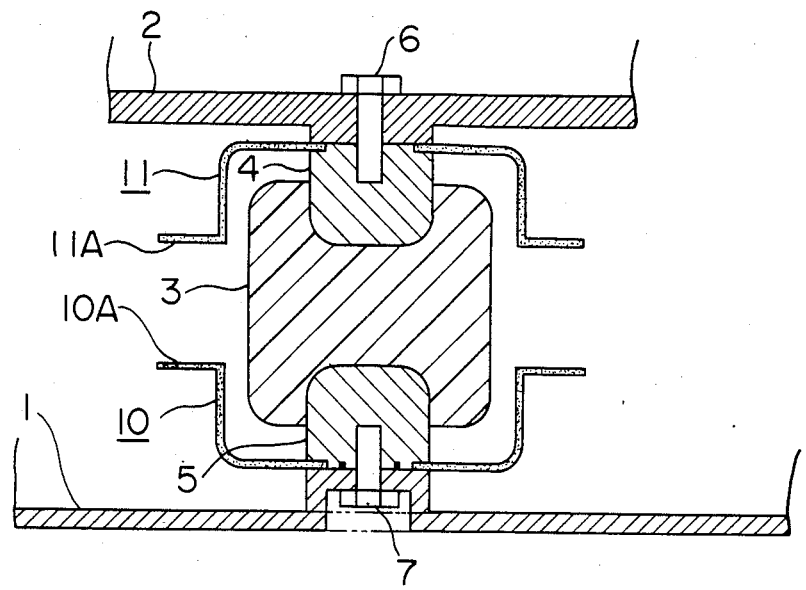
FIGS. 3 and 4 are vertical sectional views showing other embodiments of a conductor supporting apparatus for gas insulated equipment of the present invention.

FIG. 3 shows another practical embodiment of the present invention. This embodiment is constituted in a manner similar to FIG. 1 except that an insulating barrier 11 having a flange portion 11A is also attached from the metal fitting 4 on the side of the high voltage conductor 2. Ordinary gas insulated equipment is constituted such that the high voltage conductor 2 is enclosed in the cylindrical grounded tank 1. Therefore, in general, the electric field strength near the high voltage conductor 2 is stronger than that on the side of the grounded tank 1. Hence, since this phenomenon is also present at the high voltage side of the insulating spacer 3, if the conductive foreign matters should enter this portion, the situation will become severer than at the grounded side. As described above, the probability of the entrance of the conductive foreign matters into the high voltage side is fairly small. However, by use of the foregoing structure, the insulating reliability can be further improved.

Figure 4:
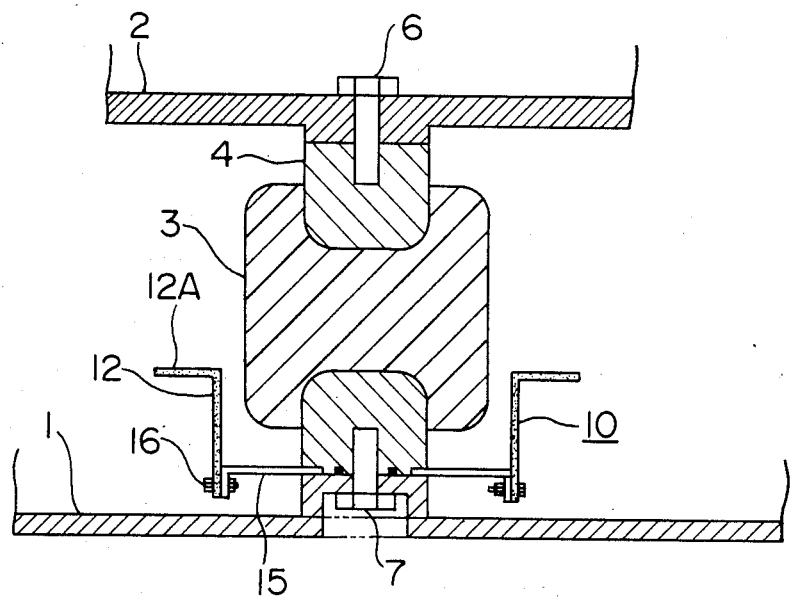

FIG. 4 shows still another practical embodiment of the present invention. The structure to attach the insulating barrier 10 of the flange portion differs from the example shown in FIG. 1. Namely, in the structure in FIG. 1, the whole insulating barrier 10 is formed by a one-piece insulating member. However, in the embodiment of FIG. 4, the insulating barrier is divided into a cylindrical insulating member 12 having a flange portion 12A and a barrier attaching metal fitting portion 15. The insulating member 12 and the metal fitting portion 15 are coupled by clamping bolts 16. In general, it is technically or economically disadvantageous to mold the thin insulating plate into a complicated shape. However, by simplifying the shape of the portion of the insulating member as in this embodiment, the economically advantageous structure can be obtained. With such a structure, it is desirable that the connecting positions of the insulating member 12 and metal fitting portion 15 fall within as low an electric field region as possible.

By constituting the conductor supporting apparatus for the gas insulated equipment as in the present invention, even if the conductive foreign matters enter, the deterioration of the insulation performance will be small and the high dielectric strength can be maintained. The insulation performance when the conductive foreign matters were deposited onto the insulating barrier can be improved by up to 1.5 times. In addition, since the present invention can be applied without changing the shape of the insulating spacer, it is also economically advantageous.

Further, the insulating effect also can be expected even in the case of using a fairly thin insulating barrier member. Therefore, different from the creepage flanges which are ordinarily used, the drawback that the electric fields on the creeping surface of the insulating spacer are disturbed is eliminated. The shortcoming that the characteristics are lost upon cleaning also is reduced.

We claim:

1. A conductor supporting apparatus for gas insulated equipment in which a high voltage conductor is arranged in a grounded tank which is filled with insulating gas and said high voltage conductor is insulated and supported from said grounded tank by an insulating spacer having attaching metal fittings at both end portions, wherein an insulating barrier having a flange portion on the side of a free end so as to be substantially perpendicular to the surface of said insulating spacer is attached to the attaching metal fitting of the insulating spacer on at least the side of the grounded tank, and said insulating barrier surrounds the insulating spacer through a space.

2. A conductor supporting apparatus according to claim 1, wherein said insulating barrier is formed by a cylindrical insulating member having said flange portion and a barrier attaching metal fitting.

3. A conductor supporting apparatus according to claim 1, wherein the projecting length of the flange portion is within a range from ten millimeters to tens of millimeters.

4. A conductor supporting apparatus according to claim 1, wherein said insulating barrier is attached so as to be sandwiched by said grounded tank and the attaching metal fitting of said insulating spacer.

5. A conductor supporting apparatus according to claim 1, wherein said insulating barrier is formed from a molded resin having a low dielectric constant.

6. A conductor supporting apparatus for gas insulated equipment in which a high voltage conductor is arranged in a grounded tank which is filled with insulating gas and said high voltage conductor is insulated and supported from said grounded tank by an insulating spacer having attaching metal fittings at both end portions, wherein an insulating barrier having a flange portion on the side of a free end so as to be substantially perpendicular to the surface of the insulating spacer is attached to the portion of the insulating spacer on at least the side of the grounded tank such that said insulating barrier is sandwiched by the grounded tank and the attaching metal fitting thereat, and the insulating barrier surrounds the insulating spacer through a space of at least a few millimeters.

7. A conductor supporting apparatus according to claim 6, wherein said insulating barrier is formed by a cylindrical insulating member having said flange portion and a barrier attaching metal fitting.

8. A conductor supporting apparatus according to claim 6, wherein the projecting length of the flange portion is within a range from ten millimeters to tens of millimeters.

* * * * *